United States Patent
Deming et al.

(10) Patent No.: US 9,357,787 B2
(45) Date of Patent: Jun. 7, 2016

(54) FORCED MOISTURE EVACUATION FOR RAPID BAKING

(71) Applicant: Middleby Marshall Holdings LLC, Menominee, MI (US)

(72) Inventors: Matthew E. Deming, Peshtigo, WI (US); Mark E. Halpin, Plattsburgh, NY (US); Sarah J. Tresser, Williston, VT (US)

(73) Assignee: MIDDLEBY MARSHALL HOLDINGS LLC, Menominee, MI (US)

( * ) Notice: Subject to any disclaimer, the term of this patent is extended or adjusted under 35 U.S.C. 154(b) by 65 days.

(21) Appl. No.: 14/173,273

(22) Filed: Feb. 5, 2014

(65) Prior Publication Data

US 2015/0004296 A1 Jan. 1, 2015

Related U.S. Application Data

(60) Provisional application No. 61/839,976, filed on Jun. 27, 2013.

(51) Int. Cl.
*F24C 15/00* (2006.01)
*A21B 1/00* (2006.01)
(Continued)

(52) U.S. Cl.
CPC ... *A21B 3/04* (2013.01); *A21B 1/26* (2013.01); *A21D 8/06* (2013.01); *F24C 15/2007* (2013.01); *F24C 15/322* (2013.01); *F24C 15/325* (2013.01)

(58) Field of Classification Search
CPC ....... F24C 15/322; F24C 15/325; A21B 1/26; A21B 1/36

USPC ........... 99/476, 475; 219/400, 401; 126/21 A, 126/20

See application file for complete search history.

(56) References Cited

U.S. PATENT DOCUMENTS 4,181,613 A * 1/1980 Welsh et al. .................. 210/179
4,208,572 A * 6/1980 Melgaard ...................... 219/400
(Continued)

FOREIGN PATENT DOCUMENTS

EP 0 732 549 A2 3/1996
EP 0 959 305 A2 5/1999
(Continued)

OTHER PUBLICATIONS

Invitation to Pay Additional Fees and, Where Applicable, Protest Fee, with Annex A (Communication Relating to the Results of the Partial International Search), dated Jul. 28, 2014, 7 pages.

(Continued)

*Primary Examiner* — Reginald L Alexander
(74) *Attorney, Agent, or Firm* — Brinks Gilson & Lione

(57) ABSTRACT

A baking device is provided. The baking device includes a housing enclosing a baking compartment and an air handling compartment, the air handling compartment and the baking compartment being separated by a pressure panel that defines a rear wall of the baking compartment, the pressure panel including an aperture allowing fluid communication between the baking and air handling compartments. A blower wheel is mounted in conjunction with the aperture, such that rotation of the blower wheel urges air movement from the baking compartment and into the air handling compartment. A secondary blower is arranged in fluid communication with the air handling compartment, wherein operation of the secondary blower urges ambient air into the air handling compartment.

19 Claims, 5 Drawing Sheets

(51) Int. Cl.
*A21B 3/04* (2006.01)
*A21D 8/06* (2006.01)
*F24C 15/32* (2006.01)
*A21B 1/26* (2006.01)
*F24C 15/20* (2006.01)

(56) References Cited

U.S. PATENT DOCUMENTS

| | | | | |
|---|---|---|---|---|
| 4,420,679 | A * | 12/1983 | Howe | 219/400 |
| 6,723,970 | B1 | 4/2004 | Whipple, Jr. | |
| 7,060,940 | B2 * | 6/2006 | Kim et al. | 219/400 |
| 7,102,105 | B2 * | 9/2006 | Oh | 219/400 |
| 7,368,683 | B2 * | 5/2008 | Kim et al. | 219/400 |
| 2002/0179588 | A1 | 12/2002 | Lubrina et al. | |
| 2010/0282097 | A1 * | 11/2010 | Schulte | 99/476 |

FOREIGN PATENT DOCUMENTS

| | | |
|---|---|---|
| EP | 1 209 420 A1 | 11/2001 |
| EP | 2 083 223 A1 | 10/2007 |
| EP | 2 466 211 A1 | 12/2011 |
| EP | 2 687 787 A2 | 1/2014 |
| EP | 2 786 659 A1 | 8/2014 |
| FR | 2 797 682 | 8/2000 |

OTHER PUBLICATIONS

International Preliminary Report on Patentability and Written Opinion of the International Searching Authority for PCT/US2014/022272, dated Dec. 29, 2015, 11 pp.

Invitation to Pay Additional Fes and Where Applicable Protest Fee with Partial International Search, PCT/US2015/064877, dated Feb. 12, 2016, 8 pp.

* cited by examiner

FORCED MOISTURE EVACUATION FOR RAPID BAKING

CROSS-REFERENCE TO RELATED APPLICATIONS

This application claims priority from U.S. provisional application No. 61/839,976 filed on Jun. 27, 2013, the entirety thereof is hereby fully incorporated by reference herein.

TECHNICAL FIELD

The technical field of the disclosure is related to baking ovens.

BRIEF SUMMARY

A first representative embodiment of the disclosure is provided. The embodiment includes a baking device. The baking device includes a housing enclosing a baking compartment and an air handling compartment, the air handling compartment and the baking compartment being separated by a pressure panel that defines a rear wall of the baking compartment, the pressure panel including an aperture allowing fluid communication between the baking and air handling compartments. A blower wheel is mounted in conjunction with the aperture, such that rotation of the blower wheel urges air movement from the baking compartment and into the air handling compartment. A secondary blower is arranged in fluid communication with the air handling compartment, wherein operation of the secondary blower urges ambient air into the air handling compartment.

Another representative embodiment of the disclosure is provided. The embodiment includes a method of baking a food product. The method includes the steps of receiving an unrisen food product within a baking compartment of a baking device and allowing the unrisen food product to rest within the baking compartment for a time to allow the unrisen food product to rise. The method further includes the steps of operating a secondary blower to inject ambient air into the baking compartment after the time to allow the unrisen food product to rise is complete, and heating the baking compartment to bake the food product.

Advantages of the disclosed apparatus and method will become more apparent to those skilled in the art from the following description of embodiments that have been shown and described by way of illustration. As will be realized, other and different embodiments are contemplated, and the disclosed details are capable of modification in various respects. Accordingly, the drawings and description are to be regarded as illustrative in nature and not as restrictive.

DETAILED DESCRIPTION OF THE DRAWINGS AND THE PRESENTLY PREFERRED EMBODIMENTS

Figure 1:
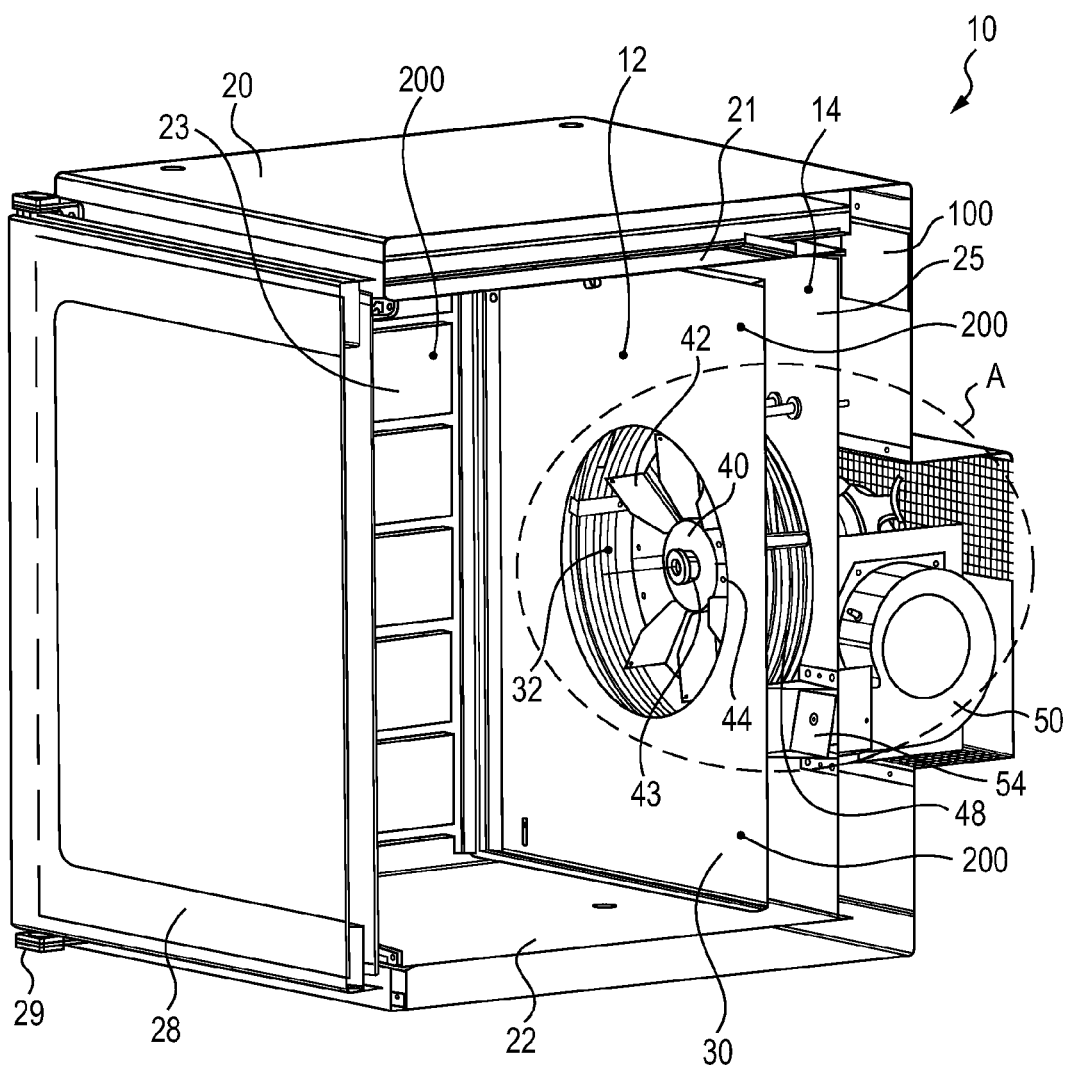
FIG. 1 is a perspective view of a portion of a baking compartment and an air handling compartment of a baking device.

Turning now to FIGS. 1-4, a baking device 10 is provided. The baking device 10 may be configured to both "proof" an unrisen food product (such as dough, or combinations of dough and other foods, or other types of food products that might be known in the art to require, or benefit from, a proofing operation and a baking operation, in series) provided within a baking volume 12 of the device as well as bake the food product disposed therein. As is well known in the art, "proofing" a food product is known as allowing time for the food product (such as un-risen dough) to rise prior to cooking, which may expeditiously occur in an environment with a relative high humidity, and with a temperature over normal ambient temperature, such as about 105 degrees Fahrenheit.

The baking device 10 may be configured to automatically align itself for proofing as well as for baking, such that both operations can occur within the baking device 10 without any operator action.

The baking device 10 includes a housing 20 that encloses a baking volume 12 and an air handling compartment 14. The baking compartment 12 is defined by an upper wall 21, a right wall 23, a left wall (not shown, but similar to the right wall), a lower wall 22, and a pressure panel 30 that forms the rear wall of the baking compartment 12. The walls that form the baking compartment 12 are each rigidly mounted to the housing 20 of the baking device 10 with suitable support and fastening structures as known in the art. The baking compartment 12 is normally enclosed by one or two doors 28 that are pivotably mounted to the housing 20 and can be selectively opened and closed to selectively enclose the baking compartment 12 and allow access therein.

In some embodiments, the baking compartment 12 is vented to the atmosphere through a vent 80, which communicates with the baking compartment 12 through a vent opening 82. The vent 80 may be open to the atmosphere, or in some embodiments may be controlled by a door, which is operatively controlled to expose or conceal the vent by the controller 100 (shown schematically in FIG. 1).

The housing 20 further encloses an air handling compartment 14, which is partially enclosed by the pressure panel 30, as well as portions of the housing 20 that enclose the upper, lower, rear and side walls of the air handling compartment 14. The air handling compartment 14 includes a blower wheel 40 that is rotatably connected to a motor. The blower wheel 40 includes a plurality of fins 42 that extend from a rotor 43 of the blower wheel 40. The blower wheel 40 may be mounted in conjunction with an aperture 32 in the pressure panel 30 that allows for air to flow from the baking compartment 12 and into the blower wheel 40 when the blower wheel 40 is rotating. As shown schematically in FIG. 2, rotation of the blower wheel 40 urges air to flow along the flow-path X, i.e. from the baking compartment 12, through the aperture 32, into the blower wheel 40 and then radially outward from the blower wheel 40.

Figure 2:
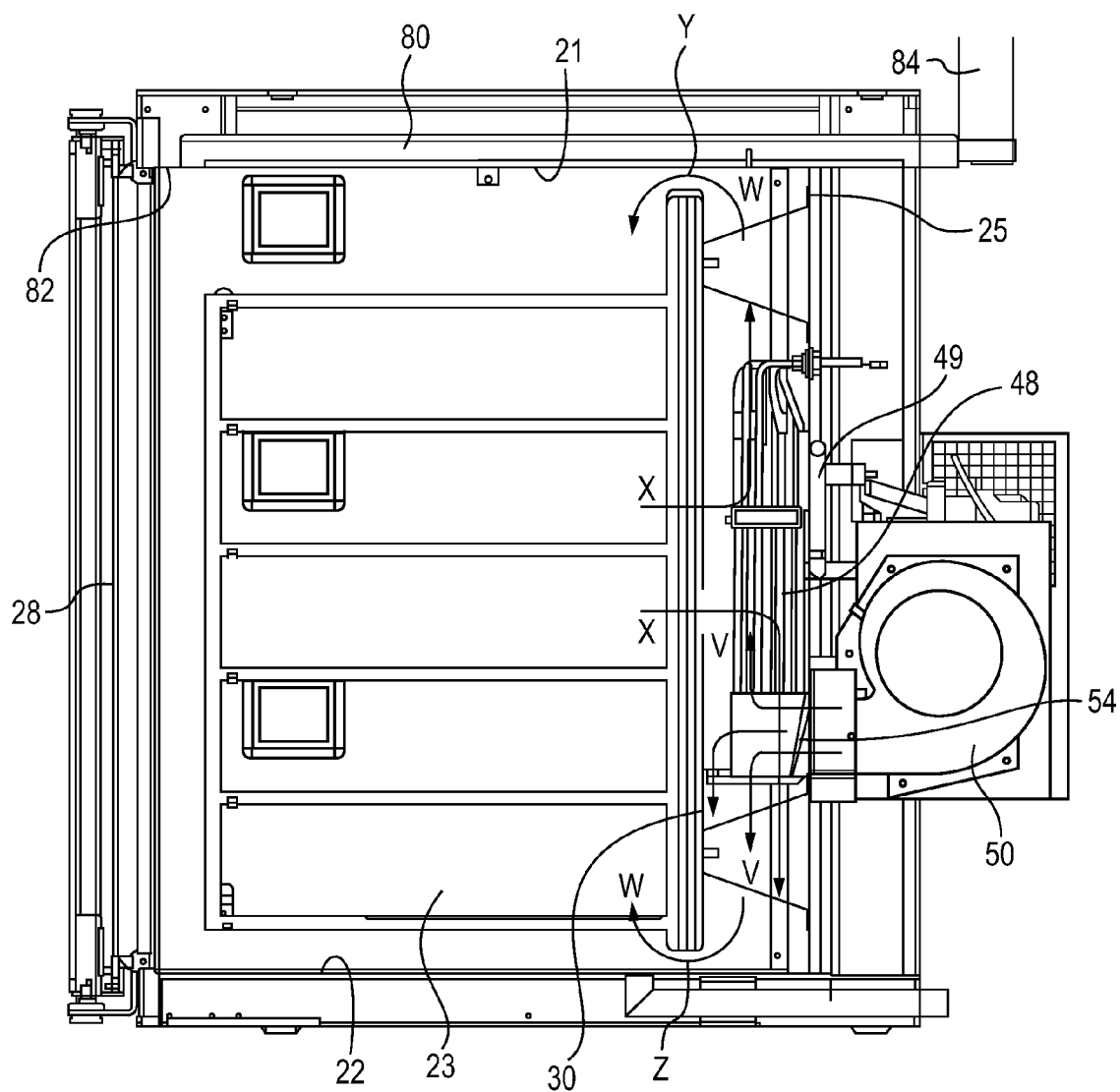
FIG. 2 is a right side view of the view of FIG. 1.
Figure 3:
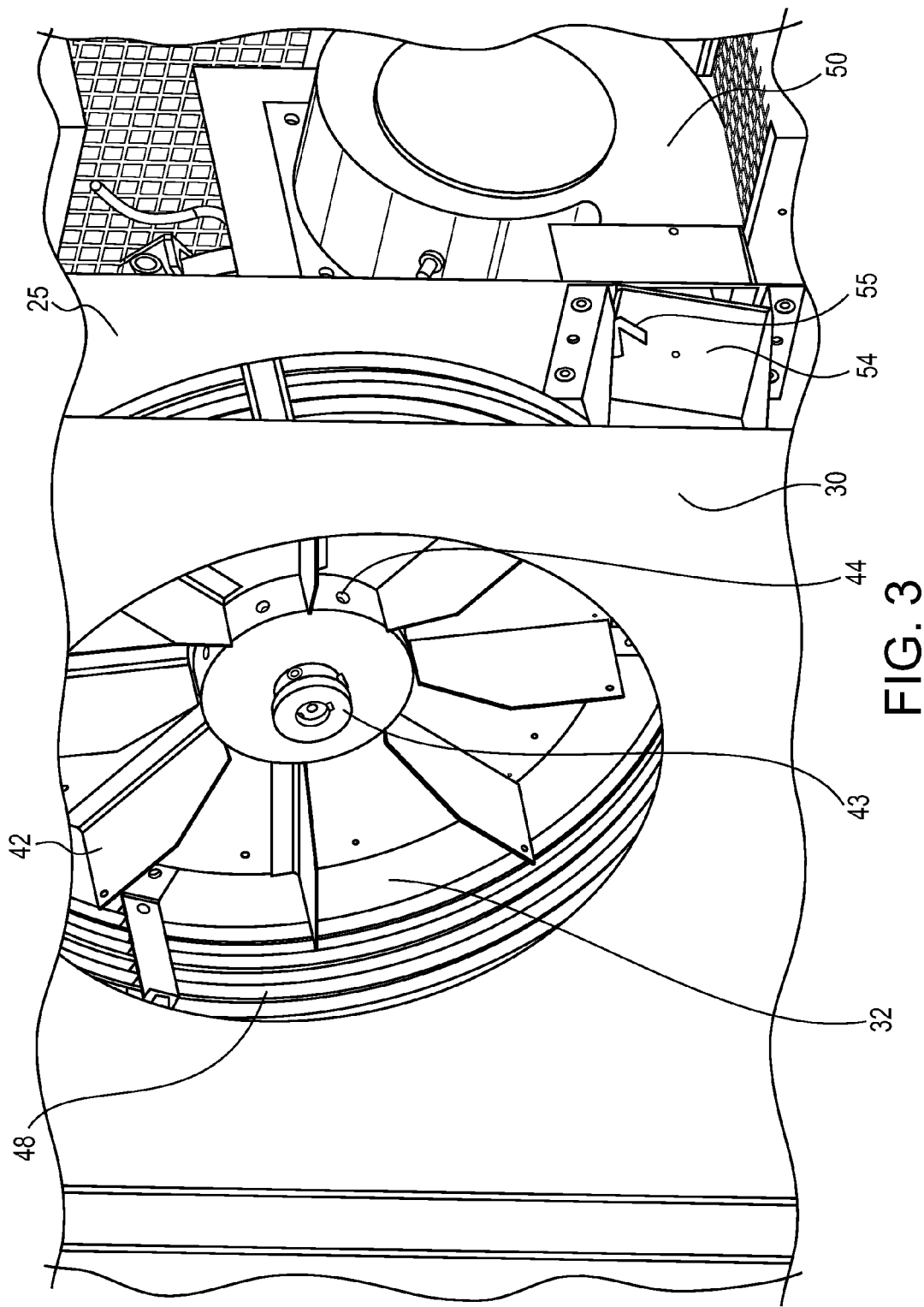
FIG. 3 is a view of detail A of FIG. 1.
Figure 4:
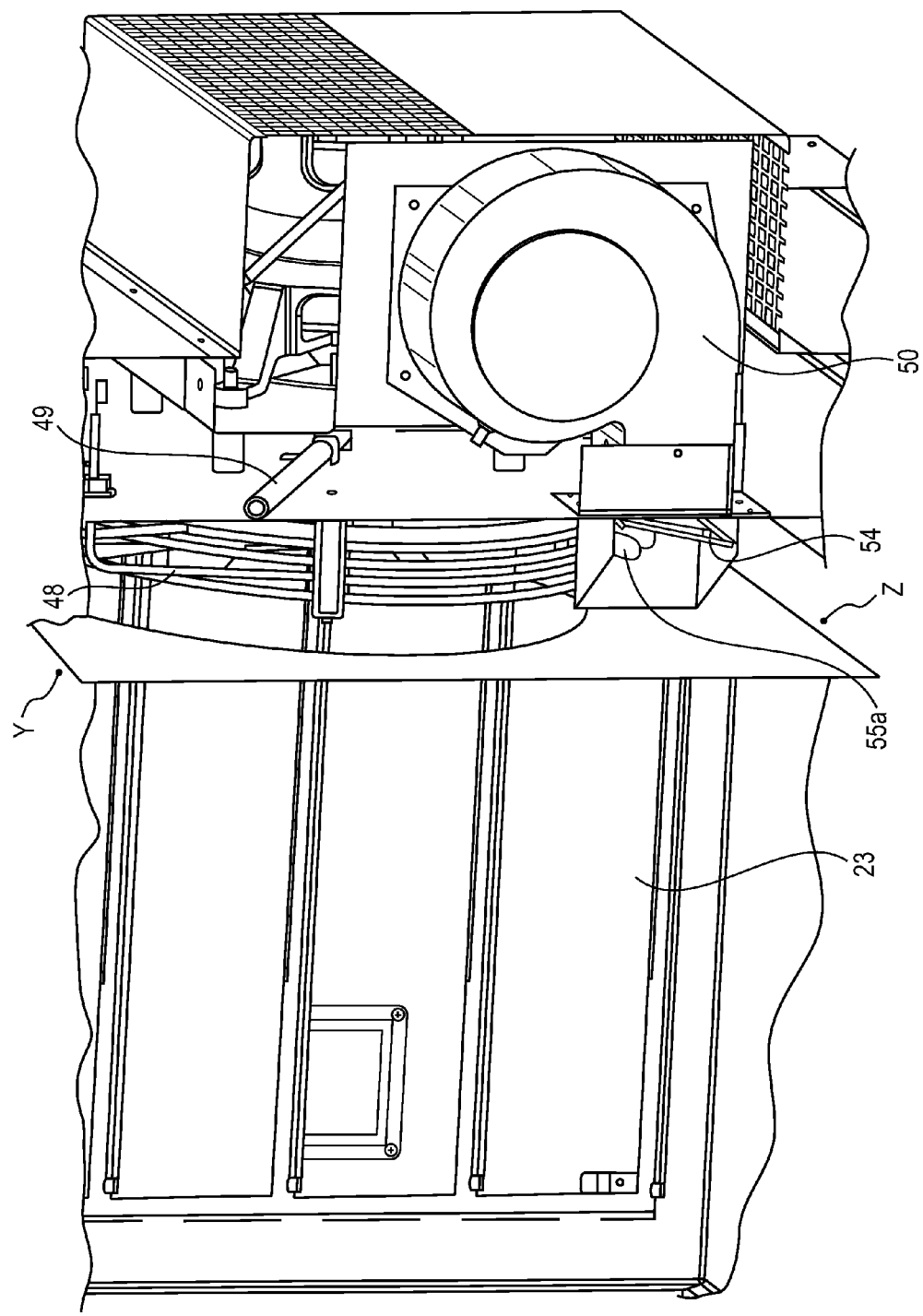
FIG. 4 is a view of a portion of the air handling compartment of FIG. 1 from the rear of the baking device.

The blower wheel 40 may further include one or more spouts 44 that are disposed upon the rotor 43 of the blower wheel (or another suitable location upon or with respect to the blower wheel 40). The spouts 44 are configured to spray water onto the fins 42 (or another portion) of the blower wheel 40 as it is rotating. The water spray is "cut" by the fast moving blower wheel, which atomizes the water and increases the humidity within the air handling compartment 14 and the baking compartment 12 (due to the air flow pattern discussed below). The controller (shown schematically as 100) is operationally connected to the blower wheel 40 (as well as other portions of the baking device 10, such as the heaters 48) to selectively operate the blower wheel 40 and the injection of water through the spouts 44, based upon the operation of a water system 49 (FIGS. 2 and 4).

As mentioned above, the air handling compartment 14 is separated from the baking compartment 12 by the pressure panel 30. The pressure panel 30 may be mounted to a plurality (such as four) standoffs (not shown) that are fixed to the back panel 25. In other embodiments, the pressure panel 30 may be mounted to one or both of the right side wall 23 and the left side wall, such that an edge of the pressure panel 30 rests snuggly upon the right side wall 23 and the left side wall, or with a mounting structure therebetween. In some embodiments, the pressure panel 30 and one or both of the upper and lower walls 21, 22 define an upper space Y and a lower space Z, respectively, therebetween that allows for fluid communication from the air handling compartment 14 to the baking compartment 12.

In some embodiments, the upper space Y and/or the lower space Z may extend along the entire width of the baking compartment 12, while in other embodiments, the upper space Y and/or the lower space Z may extend along only a portion of the width of the baking compartment 12, and may be centered within the baking compartment 12 or offset within the baking compartment 12. As best appreciated by FIG. 2 (and discussed further below), the upper space Y and lower space Z each provide a space for air flow from the air handling compartment 14 to return to the baking compartment 12 (shown schematically as W), which is urged due to forced flow when the blower wheel 40 is rotating, as well as when the secondary blower 50 (discussed below) is operating.

In other embodiments, the pressure panel 30 may be mounted to one or both of the upper and lower panels 21, 22 with gaps formed between the side edges of the pressure panel 30 and respective right panel 23 and/or left panel (left panel not shown but similar to the right panel 23). The air flow from the air handling compartment 14 to the baking compartment 12 in this embodiment would be similar to the air flow path W depicted in FIG. 2 although one of ordinary skill would easily understand that the flow path would be between the side gaps between the pressure panel 30 and the side walls.

The air handling compartment 14 further includes a secondary blower 50 that is mounted to inject air (which may be drawn from the ambient or from another source) into the air handling compartment 14. The secondary blower 50 is configured to operate to inject air into the baking device 10 to increase the pressure within the housing 20, and specifically the baking compartment 12, to urge the air to exit the baking compartment 12 through the vent 80 (discussed above). As shown schematically in FIG. 2, during operation of the secondary blower 50, air enters into the air handling compartment 14 from the discharge of the secondary blower 50 as shown as path V, and upon interaction with the rear surface of the pressure panel 30, either flows upward (past the blower wheel 40) and into the baking compartment 12 through the upper space Y, or downward and into the baking compartment through lower space Z. The secondary blower 50 normally operates when the one or more doors 28 are closed to allow the environment within the baking compartment 12 to be changed out (i.e. the relatively hot air and or the relatively humid air) rapidly due to the pressure increase within the baking compartment 12, which urges air within the cooking compartment 12 to exit through the vent 80. The secondary blower 50 (operating in conjunction with the other features of the baking device 10) allows for the device 10 to change between "proofing" and baking configurations in a relatively rapid manner and without any operator action or manual reconfiguration of the device.

The discharge of the secondary blower 50 may be selectively isolated by a flapper 54. In some embodiments, the flapper 54 is normally shut to prevent the flow of air from within the air handling compartment 14 to flow into the secondary blower 50 when not in operation. The flapper 54 is configured to open (either by the discharge pressure of the secondary blower 50 or automatically (with a solenoid or other suitable operator (shown schematically as 55a in FIG. 4)) to allow the discharge of the secondary blower 50 to enter the air handling compartment 14, along air flow path V shown schematically in FIG. 2. In other embodiments, the flapper may be biased, or urged, toward the open (or closed) position with a spring 55, or alternatively biased by to the force of gravity acting upon the flapper 54. In embodiments, where the flapper 54 is biased to the closed position, the flapper 54 may be selectively opened by a solenoid or other automatic and remote opening feature (that operates against the biasing force), or may be opened due to the discharge force of the secondary blower 50 imparted upon the flapper 54. Alternatively, in embodiments, where the flapper 54 is biased open, a solenoid or other automatic and remote opening feature (that operates against the biasing force) may be provided to automatically close the flapper 54 when appropriate.

FIGS. 1-4 each show the flapper 54 as partially open, and one of ordinary skill in the art will understand with reference to this specification that the flapper 54 can move to (or be moved to) a position where the discharge of the secondary blower 50 is isolated. One of ordinary skill will also appreciate that the flapper 54 may be able to open more fully than depicted in the figures (such as at an orientation substantially parallel to the direction of air flow from the secondary blower 50) as urged by the air flow, or as urged open by another structure, such as a solenoid valve. In some embodiments, the flapper 54 may be hingedly attached to the housing 20, at one of the top, bottom, or right or left sides of the flapper 54 and be urged to the isolation positions by a spring (shown schematically in FIG. 3 as 55).

Figure 5:
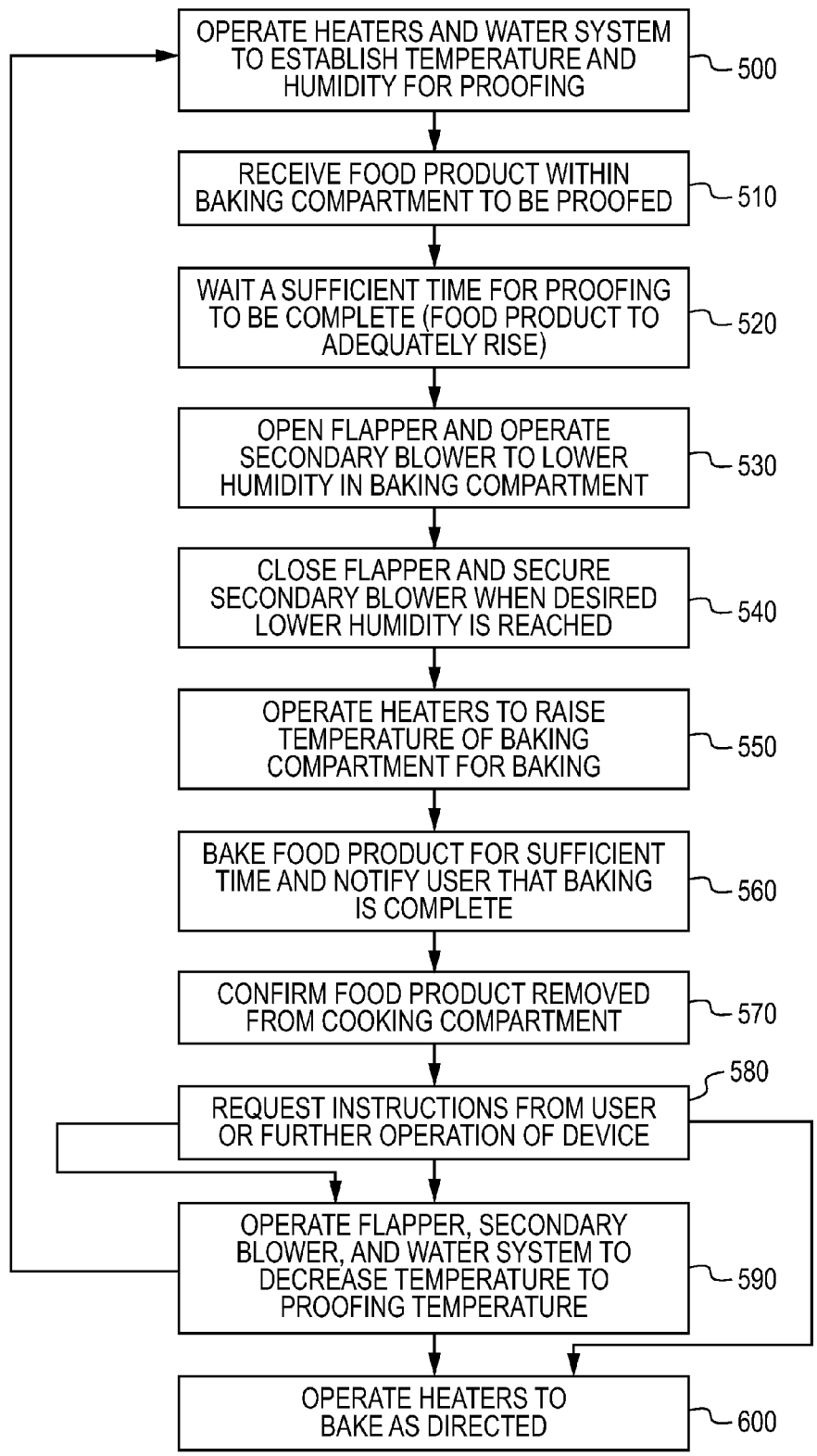
FIG. 5 is a flow-chart of the steps used by the device of FIG. 1 in performing a proofing and baking cycle.

In use and as shown in FIG. 5, the device 10 may operate with the baking compartment 12 operating as a proofer (i.e. a holding environment for a food product (such as dough) to allow the food product to expeditiously rise in the presence of a somewhat elevated temperature over room temperature as well as a relatively high humidity). The device 10 may then be automatically configured such that the baking compartment 12 is converted to a baking environment, with the temperature therein increased to a normal baking temperature (e.g. 350-375 degrees) with a lower humidity than in the proofing step.

Initially, the baking compartment 12 is configured to receive an un-risen food product therein, which may occur when the baking compartment has a temperature and humidity similar to ambient conditions, or in a situation where the baking compartment has an increased temperature (e.g. to about 90 degrees) and/or with an increased humidity. If the baking compartment 12 needs to be adjusted (either in humidity or temperature) to a proofing environment, then the heaters 48 may be cyclically operated to increase the temperature within the baking compartment 12, and/or the blower wheel 40 and associated water system 49 and spouts 43 may be operated to increase the relative humidity of the baking compartment 12 (through fluid and thermal communication with the air handling compartment 14 through one or more of the aperture 32, and the upper and lower spaces Y, Z) (step 500). The operation of the heaters 48 and/or the blower wheel 40 and water system 49 may be operated by the controller 100 in response to various parameter measurements of the baking compartment 12 made by temperature, humidity, or other sensors (shown schematically as 200 in FIG. 1) disposed with respect to the baking compartment 12.

After the baking compartment 12 is at a suitable proofing temperature and humidity, the food product is received within the baking compartment 12 (as monitored by the opening and closing of the doors 28, or by an input provided by the operator) (step 510), the baking compartment 12 may be maintained with these conditions for a sufficient time for adequate rising of the food product, as controlled by the controller 100 (step 520). In some embodiments, the controller 100 may be pre-programmed with various "recipes" or operations to control the operation of the device (such as the proofing time) based upon an input by the user (into an input device, either on the baking device 10 or associated with the baking device 10) of the food to be proofed and baked. In other embodiments, the elapsed proofing time may be monitored by the user, and the steps to reconfigure the baking compartment 12 for baking may be directed by the user.

After the completion of the sufficient proofing time, the controller 100 may initiate flow of the secondary blower 50 (step 530). In embodiments where the position of the flapper 54 is controlled by the controller 100 (and not based upon the discharge pressure of the secondary blower 50), the controller 100 provides the appropriate signal to open the flapper 54 prior to initiating the secondary blower 50. The operation of the secondary blower 50 increases the pressure within the baking compartment 12, which urges the air therewithin (with a relatively high humidity) to exit the baking compartment through the vent 80, which is replaced with air that is at the ambient humidity. In some embodiments, the secondary blower 50 may cycle for a sufficient time to replace an amount of air equivalent to a certain number of volumes of the baking compartment 12 (or the combined baking compartment 12 and air handling compartment 14), such as 5 or 10 volumes, to ensure that the humidity of the baking compartment 12 has decreased to acceptable levels for baking. In other embodiments, the secondary blower 50 may operate for as long as needed to have the monitored humidity within the baking compartment 12 (as monitored by a humidity sensor 200) to decrease to acceptable levels.

After the secondary blower 50 has operated for a sufficient amount of time and/or an acceptable humidity has been reached (as monitored by the sensors 200 and controller 100), the secondary blower 50 is secured and the flapper 54 is allowed to close (or is closed by the controller 100) (step 540). The heaters 48 then operate to increase the temperature of the baking compartment 12 to the normal baking temperature, as controlled by the controller 100 (step 550). In some embodiments, the baking temperature may be stored in the controller 100 based upon a recipe, or the cooking temperature may be inputted into the device 10 by the user. In some embodiments, the blower wheel 40 may be rotated during the operation of the heaters 48 to increase the uniformity of the temperature within the baking compartment 12 (due to the flow paths X and W, FIG. 2, when the blower wheel 40 is operating). After the desired temperature is reached, the heaters 48 (and blower wheel 40 as appropriate) are cyclically operated to maintain the temperature (either a constant temperature, or in some embodiments a controlled but changing temperature if appropriate) for a desired baking time (step 560). At the conclusion of the baking time, the controller 100 initiates an alarm to notify the user that the food product can be removed from the baking compartment 12.

Upon removal of the food product, the controller further operates the device 10 as desired based upon the user (which may include the user providing certain inputs of the next desired step, i.e. another proofing/baking cycle, another baking (only) cycle, etc.). In some embodiments, the opening and closing of the one or more doors 28 may generate a signal to the controller 100 that the food product has been removed, while in other embodiments, the user may manually indicate that the food product has been removed. The controller 100 in this step confirms that the baked food product has been removed from the baking compartment (step 570).

The controller 100 then may request the user to provide further instructions of what the next operation of the device 10 that is desired (step 580). Upon receipt of a signal that another proofing/baking cycle is desired (and receives a signal that the food product has been removed from the baking compartment 12), the controller 100 then cools down the baking compartment 12 to an environment suitable for proofing (step 590). The controller 100 starts the secondary blower 50 (which opens the flapper 54, or the controller 100 causes the flapper 54 to open), which introduces ambient air into the baking compartment 12 and the air handling compartment 14. The operation of the secondary blower 50 increases the pressure within the baking compartment 12, which causes air therewithin to exit the baking compartment 12 through the vent 80. The blower wheel 40 may operate at this time to increase the mixing of the air within the baking compartment 12 and air handling compartment 14, and in some embodiments, the water system 49 and the spouts 44 may introduce water into the air handling compartment 14, to decrease the air temperature due to the energy loss as the water flashes to steam. When the desired proofing temperature is reached (as monitored by the sensors 200 within the baking compartment 12), the secondary blower 50 is secured (and the flapper 54 is closed, either automatically, or by the controller 100). The user is then notified that the baking compartment 12 is ready for another proofing cycle. After the controller 100 senses that a food product to-be-proofed has been placed within the baking compartment 12 (by the signals of the one or more doors 28 opening and closing, or by an input by the user), the controller 100 initiates the next proofing and baking cycle as discussed above.

While the preferred embodiments have been described, it should be understood that the invention is not so limited and modifications may be made without departing from the invention. The scope of the invention is defined by the appended claims, and all devices that come within the meaning of the claims, either literally or by equivalence, are intended to be embraced therein.

The invention claimed is:

1. A baking device, comprising:
 a housing enclosing a baking compartment and an air handling compartment, the air handling compartment and the baking compartment separated by a pressure panel that defines a rear wall of the baking compartment, the pressure panel including an aperture allowing fluid communication between the baking and air handling compartments;
 a blower wheel mounted in conjunction with the aperture, such that rotation of the blower wheel urges air movement from the baking compartment and into the air handling compartment;
 a secondary blower arranged in fluid communication with the air handling compartment, wherein operation of the secondary blower urges ambient air into the air handling compartment, and
 further comprising a flapper disposed in fluid communication with a discharge of the secondary blower into the air handling compartment, such that the flapper prevents backflow of air into the secondary blower from the air handling compartment when in a closed position, but allows the flow of air from the secondary blower into the air handling compartment.

2. The baking device of claim 1, wherein the pressure panel is mounted to the housing, wherein the pressure panel is sized to create a gap between one of a top wall or a bottom wall defining the baking compartment and the pressure panel.

3. The baking device of claim 2, wherein the gap is a first gap between the top wall and the pressure panel and a second gap between the bottom wall and the pressure panel.

4. The baking device of claim 1, wherein the flapper is urged toward the closed position with a spring.

5. The baking device of claim 1, wherein the flapper is urged into the closed position with a solenoid.

6. The baking device of claim 1, wherein the flapper is urged toward the closed position due to the force of gravity acting upon the flapper.

7. The baking device of claim 1, wherein the flapper is urged toward the closed position, and wherein operation of the secondary blower urges the flapper to the open position.

8. The baking device of claim 1, wherein the housing further comprises a vent which takes suction from the baking compartment and is arranged to allow fluid communication of air within the baking compartment to the ambient.

9. The baking device of claim 8, wherein operation of the secondary blower urges air within the baking compartment into the vent.

10. The baking device of claim 1, wherein the blower wheel comprises one or more fluid ports and a plurality of fins, wherein the device is configured to selectively expel a flow of water through the one or more fluid ports when the blower wheel is rotating.

11. The baking device of claim 1, wherein the secondary blower is operatively connected with a controller, such that the secondary blower operates in response to a signal from the controller.

12. The baking device of claim 1, wherein the pressure panel is mounted to one or both of a right side wall of the housing and a left side wall of the housing, wherein the pressure panel is sized to create a gap between one of a top wall or a bottom wall defining the baking compartment and the pressure panel.

13. A baking device, comprising:
a housing enclosing a baking compartment and an air handling compartment, the air handling compartment and the baking compartment separated by a pressure panel that defines a rear wall of the baking compartment, the pressure panel including an aperture allowing fluid communication between the baking and air handling compartments, the housing further comprising a door movably mounted to the housing between a closed position to enclose the baking compartment and an open position to allow access to the baking compartment;
a blower wheel mounted in conjunction with the aperture, such that rotation of the blower wheel urges air movement from the baking compartment and into the air handling compartment; and
a secondary blower arranged in fluid communication with the air handling compartment, wherein operation of the secondary blower urges ambient air into the air handling compartment,
wherein the housing further comprises a vent which takes suction from the baking compartment and is arranged to allow fluid communication of air within the baking compartment to the ambient, wherein the vent is open to the ambient, wherein operation of the secondary blower increases pressure within the baking compartment therefore urging air within the baking compartment into the vent.

14. The baking device of claim 13, wherein the pressure panel is mounted to the housing, wherein the pressure panel is sized to create a gap between one of a top wall or a bottom wall defining the baking compartment and the pressure panel.

15. The baking device of claim 14, wherein the gap is a first gap between the top wall and the pressure panel and a second gap between the bottom wall and the pressure panel.

16. The baking device of claim 13, wherein the blower wheel comprises one or more fluid ports and a plurality of fins, wherein the device is configured to selectively expel a flow of water through the one or more fluid ports when the blower wheel is rotating.

17. The baking device of claim 13, wherein the secondary blower is operatively connected with a controller, such that the secondary blower operates in response to a signal from the controller.

18. The baking device of claim 13, wherein the door is pivotably mounted to the housing.

19. The baking device of claim 13, wherein the secondary blower is operable when the door is in the closed position.

* * * * *